(12) United States Patent
Sendag (10) Patent No.: US 8,312,255 B2
(45) Date of Patent: Nov. 13, 2012

(54) SYSTEM AND METHOD FOR BRANCH MISPREDICTION PREDICTION USING A MISPREDICTED BRANCH TABLE HAVING ENTRY EVICTION PROTECTION

(75) Inventor: Resit Sendag, Wakefield, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 552 days.

(21) Appl. No.: 12/473,622

(22) Filed: May 28, 2009

(65) Prior Publication Data

US 2009/0287912 A1    Nov. 19, 2009

Related U.S. Application Data

(63) Continuation of application No. PCT/US2007/088065, filed on Dec. 19, 2007.

(60) Provisional application No. 60/870,678, filed on Dec. 19, 2006.

(51) Int. Cl.
*G06F 9/00* (2006.01)
(52) U.S. Cl. ...................................... 712/240
(58) Field of Classification Search .................. None
See application file for complete search history.

(56) References Cited

U.S. PATENT DOCUMENTS

| 6,092,187 | A  * | 7/2000 | Killian ........................... 712/239 |
| 2002/0087852 | A1 * | 7/2002 | Jourdan et al. ................. 712/240 |
| 2004/0255104 | A1 * | 12/2004 | Akkary et al. ................. 712/239 |
| 2005/0120192 | A1 | 6/2005 | Akkary |
| 2005/0268075 | A1 | 12/2005 | Caprioli et al. |

OTHER PUBLICATIONS

Jacobsen et al., "Assigning Confidence to Conditional Branch Predictions", Proceedings of the 29th Annual International Symposium on Microarchitecture, Dec. 1996, 12 pages.*
Henning, J., "SPEC CPU2000: Measuring CPU Performance in the New Millenium," IEEE Computer, vol. 33, No. 7, Jul. 2000, pp. 28-35.
Kalla R. et al., "IBM Power5 Chip: A Dual-Core Multithreaded Processor," IEEE Micro, vol. 24, No. 2, Mar.-Apr. 2004, pp. 40-47.
Keltcher, C. et al. "The AMD Operation Processor for Multiprocessor Servers," IEEE Micro, vol. 23, No. 2, Mar.-Apr. 2003, pp. 66-76.
Kessler, R., "The Alpha 21264 Microprocessor," IEEE Micro, vol. 19, No. 2, Mar.-Apr. 1999, pp. 24 36.
McNairy C. and Soltis D., "Itanium 2 Processor Microarchitecture," IEEE Micro, vol. 23, No. 2, Mar.-Apr. 2003, pp. 44-55.
Sharangpani H. and Arora K., "Itanium Processor Architecture," IEEE Micro, vol. 32, No. 5, Sep.-Oct. 2000, pp. 24-43.
Tendler, J. et al., "POWER4 system microarchitecture," IVM Journal of Research and Development, vol. 46, No. 1, Jan. 2004, pp. 5-25.
Burger D. and Austin, T., "The SimpleScalar Tool Set, Version 2.0," University of Wisconsin-Madison Computer Sciences Department Technical Report #1342, 1997, pp. 1-21.

(Continued)

*Primary Examiner* — David Huisman (74) *Attorney, Agent, or Firm* — Gesmer Updegrove LLP (57) ABSTRACT

A system is disclosed for providing branch misprediction prediction in a microprocessor. The system includes a mispredicted branch table that includes address, distance, and true/not true fields, and an index to the mispredicted branch table that is formed responsive to 1) a current mispredicted branch, 2) a global history, 3) a global misprediction history, and 4) a branch misprediction distance.

23 Claims, 8 Drawing Sheets

OTHER PUBLICATIONS

Guthaus, M. et al., "MiBench: A free, commercially representative embedded benchmark suite," Workshop on Workload Characterization, 2001, 12 pages.

Grunwald, D., "Confidence Estimation for Speculation Control," International Symposium on Computer Architecture, 1998, 10 pages.

Jacobsen E. et al., "Assigning Confidence to Conditional Branch Predictions," International Symposium on Microarchitecture, 1996, 12 pages.

Jimenez D. and Lin C., "Dynamic Branch Prediction with Perceptrons," International Symposium on High Performance Computer Architecture, 2001, 10 pages.

Jimenez D., "Reconsidering Complex Branch Predictors," International Symposium on High Performance Computer Architecture, 2003, pp. 1-10.

Jimenez D., "Fast Path-Based Neural Branch Prediction," International Symposium on Microarchitecture, 2004, pp. 1-10.

Jimenez D., "Piecewise Linear Branch Prediction," International Symposium on Computer Architecture, 2005, pp. 1-12.

Manne, S. et al., "Branch Prediction Using Selective Branch Inversion," International Conference on Parallel architectures and Compilation Techniques, 1999, 25 pages (3 introduction pages, & pp. 1-22).

McFarling, S., "Combining Branch Predictors," Digital Western Research Laboratory Technical Report TN-36M, 1993, 29 pages (2 introduction pages, p. i, & pp. 1-25).

Sheerwood, T. et al., "Automatically Characterizing Large Scale Program Behavior," International Conference on Architectural Support for Programming Languages and Operating Systems, 2002, pp. 1-13.

Yeh T. and Pati Y., "Two-Level Adaptive Branch Prediction," International Symposium on Microarchitecture, 1991, pp. 1-14.

* cited by examiner

```
...
N=150;                                    /130
while (condition) {
   for (i-0; i<N; i++)
      {/* This is a loop with
         alternating loop counts */ }
      N=250-N;
}
...
```

FIG. 8

SYSTEM AND METHOD FOR BRANCH MISPREDICTION PREDICTION USING A MISPREDICTED BRANCH TABLE HAVING ENTRY EVICTION PROTECTION

PRIORITY

This application is a continuation of International Patent Application No. PCT/US07/88065 filed on Dec. 19, 2007 which claims priority to U.S. Provisional Patent Application No. 60/870,678 filed Dec. 19, 2006, all of which are incorporated herein in their entirety.

BACKGROUND

The present invention generally relates to branch prediction in microprocessors, and relates in particular to systems and methods for predicting branch misprediction in microprocessors.

For modern processors, high performance generally requires high branch prediction accuracy. Microprocessors typically use complex processing paths that permit consecutive instructions to be processed at the same time. Branch prediction generally involves determining an expected flow of instructions when a microprocessor encounters a branch instruction. When the expected flow of instructions turns out to be incorrect (called branch misprediction), then the processing time is at best not improved (over serial processing), and at worst significantly negatively affected by the branch misprediction.

Since processors need to have branch predictors with high branch prediction accuracy to achieve good performance, computer designers have proposed branch predictors that are increasingly more complex and/or larger. Unfortunately, the cost of these more aggressive branch predictors include higher prediction latencies and misprediction penalties, which offset the higher prediction accuracy, in addition to requiring larger chip area and increased power consumption.

Typically, increased branch prediction accuracy therefore comes at the cost of increased complexity (e.g., more complex algorithms), chip area (e.g., larger tables), and power consumption. Unfortunately, due to longer training times, higher prediction latencies, and a higher misprediction penalty, a more complex and/or larger branch predictor may actually result in a net performance loss despite a higher prediction accuracy. Furthermore, due to increased access latencies, these branch predictors cannot be easily scaled to further improve the branch prediction accuracy.

It has been shown, for example in "Reconsidering Complex Branch Predictors," *International Symposium on High-Performance Computer Architecture*, by D. Jiménez (2003), that using large and complex branch predictors is ultimately self-defeating if the processor does not hide the branch prediction latency. In other words, assuming a more complex/larger branch predictor has a higher branch prediction latency, if the branch prediction latency is on the critical path of the processor, then the performance of the processor may actually decrease, even if the branch prediction accuracy is higher. To address this problem, a 2-level pattern history table (PHT) similar in concept to a 2-level inclusive cache hierarchy has been proposed. In this approach, the branch predictor prefetches entries from the larger, second-level PHT to first-level PHT based on the latest global history. It is sometimes desirable, therefore, to try to predict branch misprediction.

Confidence estimation for branch prediction is a conventional prediction approach that involves assigning confidence values to branches. See "Assigning Confidence to Conditional Branch Predictions," *International Symposium on Microarchitecture*, by E. Jacobsen, E. Rotenberg, and J. Smith (1996), which proposed adding confidence methods to branch predictors as a means of allocating and optimizing the processor's resources. The confidence that is assigned to a branch is based on the recent prediction history for that specific branch and the recent global history. The recent prediction history is fed into a reduction function that assigns a confidence value based on the number of correct branch predictions.

Accuracy, sensitivity, and specificity of four different confidence estimators were evaluated, for example, in "Confidence Estimation for Speculation Control," *International Symposium on Computer Architecture*, by D. Grunwald, A. Klauser, S. Manne, and A. Pleszkun (1998). Their results showed that the performance of the confidence estimator depends on the branch predictor and confidence estimator having a similar indexing scheme. While they found that the approach of E. Jacobsen, E. Rotenberg, and J. Smith above had better performance than the other three, the other three require very little hardware. In "Branch Prediction using Selective Branch Inversion," *International Conference on Parallel Architectures and Compilation Techniques*, S. Manne, A. Klauser, D. Grunwald, (1999), the use of up/down counters as confidence estimators was proposed, in which the prediction for low-confidence branch predictions is inverted. This approach is similar to the approach of E. Jacobsen, E. Rotenberg, and J. Smith above with the key difference that incorrect branch predictions decrement, rather than reset, the counter.

Finally, in "Dynamic Branch Prediction with Perceptrons," *International Symposium on High Performance Computer Architecture*, by D. Jiménez and C. Lin, (2001), combining several confidence estimators together was proposed to produce a group confidence estimate. More specifically, they sum the confidence estimates of three different confidence estimators together to form a group confidence estimate which is then compared against a confidence threshold. If the group estimate exceeds the threshold, then the prediction is marked as confident. One key difference with the composite confidence estimator and previously proposed estimators is that the composite estimator is accurate even when the misprediction rate is low. It has been found, however, that using confidence estimators to change the branch prediction, after it has already been made, will increase the prediction latency of current branch predictors and potentially increase the number of front-end pipeline stages and, subsequently, the misprediction penalty, which could significantly decrease the performance gain due to higher branch prediction accuracies.

There remains a need, therefore, for an improved system for branch misprediction prediction.

SUMMARY

In accordance with an embodiment, the invention provides a system for providing branch misprediction prediction in a microprocessor. The system includes a mispredicted branch table that includes address, distance, and true/not true fields, and an index to the mispredicted branch table that is formed responsive to 1) a current mispredicted branch, 2) a global history, 3) a global misprediction history, and 4) a branch misprediction distance.

In accordance with another embodiment, the system includes a mispredicted branch table that includes address and distance data regarding mispredictions, a distance estimator register and a history register that are coupled to the mispredicted branch table for providing the address and distance data to the table regarding a future branch that is expected to be mispredicted and misprediction time that the future branch is expected to be mispredicted, and an index to the mispredicted branch table that is employed to predict branch mispredictions.

In accordance with a further embodiment, the invention provides a method of predicting branch mispredictions in a microprocessor. The method includes the steps of providing misprediction address and distance data to a mispredicted branch table responsive to a history register and a distance estimator, and accessing the mispredicted branch table outside of the function path of a branch predictor to predict branch misprediction.

BRIEF DESCRIPTION OF THE ILLUSTRATED EMBODIMENTS

The following description may be further understood with reference to the accompanying drawings in which.

DETAILED DESCRIPTION

Although high branch prediction accuracy is necessary for high processor performance, achieving such accuracy typically requires using a branch predictor that is either too complex and/or large, which, due to higher latencies and misprediction penalty, could actually reduce the performance. Since the approaches for these mechanisms are ultimately self-defeating, the present application proposes an entirely new class of branch predictor—complementary branch predictors—which can be easily added to any branch predictor to improve the overall accuracy. This mechanism differs from conventional branch predictors in that it focuses only on the subset of branches that degrade the processor's performance, mispredicted branches. This mechanism predicts which future branch will be mispredicted next and when that will occur, and then changes the prediction at the predicted time. Results of analyses of systems of the invention show that a branch predictor with a branch misprediction predictor achieves the same prediction accuracy as a conventional branch predictor that is 4 to 16 times larger, but without lengthening the critical path or increasing the overall complexity.

Although certain prior art approaches appear to be parallel solutions (when they are used to change the branch prediction) compared to the approach presented herein, there are several important differences as compared, for example, to the use of confidence estimators. First, the reason for changing the branch prediction differs. In particular, systems of the invention change the branch prediction based on the global branch and misprediction history as well as the misprediction distance, while confidence estimators change the branch prediction based on the prediction confidence.

Second, the focus of confidence estimators for branch prediction inversion is on the current branch, whereas the approach presented herein focuses on future branches. By focusing on future branches, the mechanism of the invention may be removed from the processor's critical path, which, in contrast, then increase the prediction latency. The components of both overriding and prophet/critic hybrid predictors, as disclosed, for example, in "Prophet/critic hybrid branch prediction", *International Symposium on Computer Architecture*, by A. Falcon, J. Stark, A. Ramirez, K. Lai, and M. Valero (2004), make predictions for the same branch instruction. The difference between them is overriding predictors use the same history information to make predictions concurrently, whereas, for a prophet/critic predictor, critic predictor makes a prediction for the same branch as the prophet predictor, but at a later time and with a different history (the previous history and the history after the prophet predicted branch). Prophet/critic predictor has the advantage to reduce aliasing by potentially using some misprediction information. The branch misprediction prediction (BMP) technique of the present invention, on the other hand, does not make prediction for a specific current branch instruction. It predicts a distance and uses different information than any other predictor when predicting this distance. When, in the future, this distance is reached, the branch predictor's decision is inverted. It is a distinguishing difference that BMP operation is off of the critical path, while overriding and prophet/critic hybrid operation is not.

In accordance with various embodiments of the invention, the invention provides a system that: 1) Directly focuses on the branches that are responsible for the performance loss, i.e., mispredicted branches, 2) Makes predictions for future branches, thus moving this mechanism completely off the critical path, and 3) Reduces hardware budget necessary to achieve a specific branch prediction accuracy.

The invention, therefore, provides a new class of branch predictors—complementary branch predictors—that significantly improves the branch prediction accuracy. Systems of the invention are both more scalable and flexible, yet do not adversely affect the prediction latency, and do not occupy the branch predictor's critical path. Systems of the invention focus on improving the branch prediction accuracy of the subset of branches that degrade the processor's performance, i.e., mispredicted branches, rather than targeting all branches. Results indicate that patterns of branch mispredictions exist for all branch predictors, but that these branches cannot be easily identified and exploited when the branch prediction mechanism considers all branches. Based on this insight, complementary branch predictors are designed herein to focus on this subset of branches and to detect patterns in the branch mispredictions of the conventional branch predictor and to correct those mispredictions at the appropriate time.

This mechanism uses the branch misprediction history to predict which future branch will mispredict next and when that will occur. Then, before the misprediction actually occurs, the branch misprediction predictor—a complementary branch predictor—changes the prediction to avoid a misprediction (and the subsequent recovery) so the processor can continue executing down the correct-path. Since it only focuses on the mispredicted branches, it can improve the branch prediction accuracy of any branch predictor, static or dynamic, simple or complex.

In contrast with the state of-the-art, the BMP is not on the processor's critical path because it: 1) Is accessed only after a branch misprediction and 2) Makes predictions only for future branches. Consequently, a BMP using complementary branch predictors in general, can be easily added to the pipeline of any processor without changing the existing branch predictor and since it does not affect the prediction latency, it can be easily scaled.

Systems of certain embodiments of the invention, therefore, provide several advantages. First, they provide a new class of branch predictor (the complementary branch predictor) that improves the processor's branch prediction accuracy by tracking, detecting, and correcting patterns in the branch mispredictions.

Second, they provide complementary branch predictors that have the advantages of scalability, smaller chip area, lower power consumption, and lower prediction latency (i.e., lower misprediction penalties). They can also be added to any branch predictor or pipeline with minimal changes.

Third, the provide complementary branch predictors, as demonstrated by the BMP, that may significantly improve the branch prediction accuracy of all branch predictors, from simple gshare branch predictors to complex piecewise-linear branch predictors, for the SPEC CPU 2000 benchmarks.

Fourth, the complementary branch predictors may improve the processor's performance since they significantly improve the branch prediction accuracy without increasing the prediction latency and/or misprediction penalty.

The simulation methodology employed involved implementing the BMP in simbpred from the SimpleScalar Tool Set, version 3.0d D, *University of Wisconsin-Madison Computer Sciences Department Technical Report*, #1342, by D. Burger and T. Austin (1997). To evaluate the impact of the efficacy of the BMP over a wide range of branch predictors, we evaluated the following predictors: gshare (see "Combining Branch Predictors," *Digital Western Research Laboratory Technical Report TN-36M*, S. McFarling, (1993.)), PAp (see "Two-Level Adaptive Branch Prediction," *International Symposium on Microarchitecture*, by T. Yeh and Y. Patt, (1991)), Alpha (see "The Alpha 21264 Microprocessor," *IEEE Micro*, Vol. 19, No. 2, by R. Kessler, March-April 1999, pp. 24-36.), and piecewise-linear (see "Piecewise Linear Branch Prediction," *International Symposium on Computer Architecture*, by D. Jiménez (2005)) (PWL) branch predictors. These predictors were chosen because, collectively, they had a wide range of accuracy, complexity, and algorithms. It is expected that the BMP may be easily added to any branch predictor. The size of these predictors was varied to use a hardware budget of 1 KB to 64 KB. The size of the BMP ranged from less than 0.11 KB (64 entries) to less than 4 KB (2048 entries).

In the below analysis, benchmarks from the SPEC 2000 benchmark suite were used, and precompiled binaries were downloaded from the dot corn Internet website named simplescaler. Results are presented below for all 26 SPEC 2000 benchmarks when using the reference input set, but, for the benchmarks with more than one input set, to reduce the simulation time, one input set was randomly selected. The input set is listed in parenthesis for the following list of benchmarks that had more than one input set: gzip (graphic), vpr (route), gcc (166), art (110), eon (cook), vortex (ref1), and bzip2 (graphic).

To reduce the simulation time of the SPEC 2000 benchmarks, multiple 100M instruction simulation points were used (using "Automatically Characterizing Large Scale Program Behavior," *International Conference on Architectural Support for Programming Languages and Operating Systems*, by T. Sherwood, E. Perelman, G. Hamerly, and B. Calder, (2002)) that were generated using SimPoint 1.1 with a max_K of 10 and with 7 random seeds.

In accordance with an embodiment, the BMP system of the invention uses a simple mechanism to detect branch misprediction patterns. Namely, it counts the distance (in terms of committed branches) between consecutive branch mispredictions for that particular context (i.e., index). Although more complex methods of misprediction pattern detection are possible, we found that this approach worked well enough. In further embodiments of the invention, more complex misprediction pattern detectors may be employed. The distance represents a prediction as to when the next branch misprediction will occur.

Figure 1:
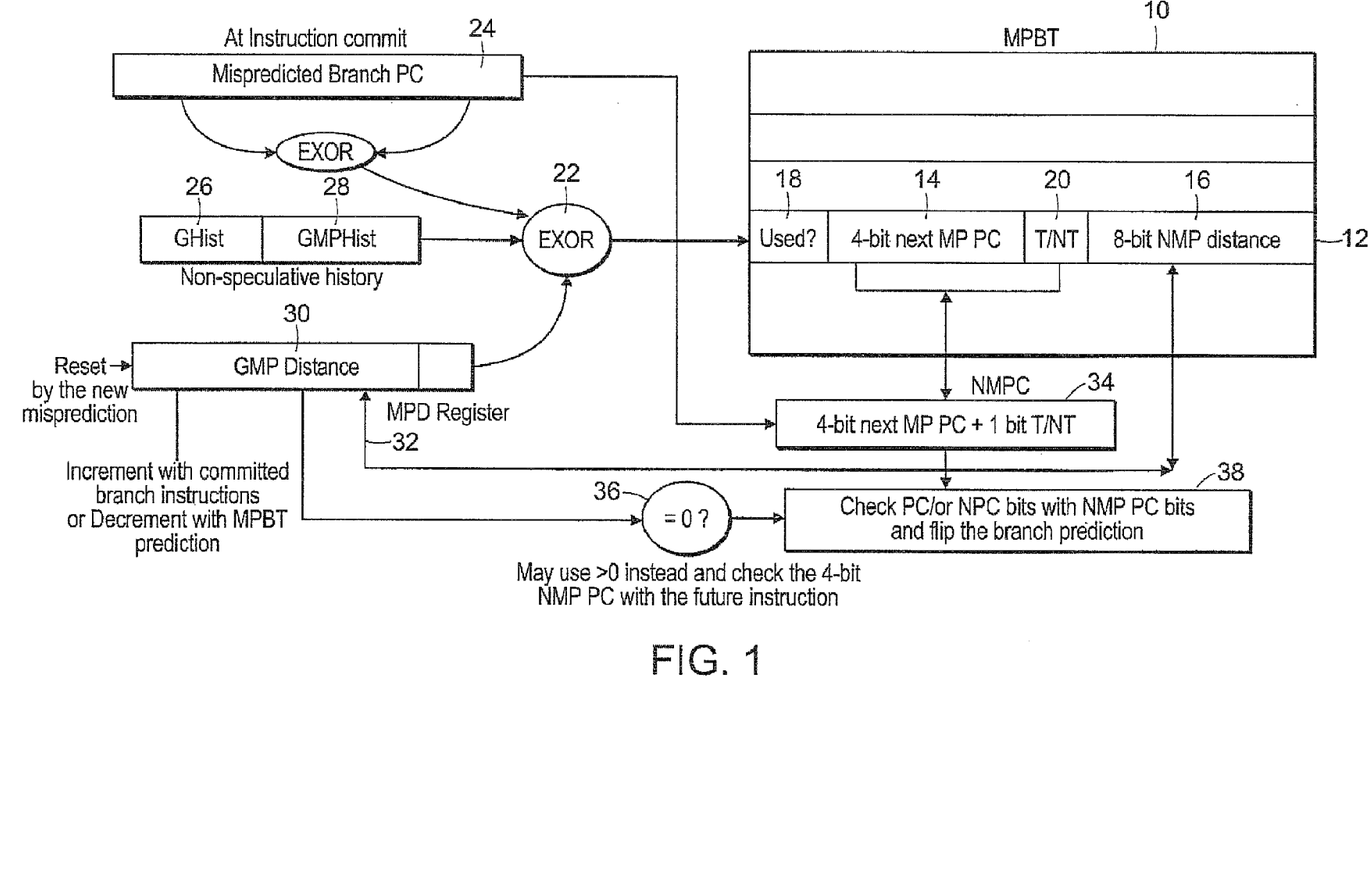
FIG. 1 shows an illustrative view of a system in accordance with an embodiment of the invention.

A primary component of the BMP is the mispredicted branch table (MPBT) 10 as shown in FIG. 1. The width of each MPBT entry (e.g., 12) is 14 bits wide; 4 bits for the address (as shown at 14), 8 bits for the distance (as shown at 16), 1 used bit (as shown at 18), and 1 T/NT bit (as shown at 20). The index is formed to the MPBT 10 by XOR-ing (22) the PC of current mispredicted branch (24) with a concatenation of the global history bits (26) and global misprediction history bits (28), and with the branch misprediction distance (30), which is the number of branches between the last two mispredictions. Other indexing methods may be employed in further embodiments of the invention.

After a branch misprediction, the BMP uses the index to access the MPBT and the corresponding entry is copied into two registers: 1) The 8-bit misprediction distance (MPD) register (32) and a 2) 5-bit register (34) that holds the 4-bit next-to-be-mispredicted PC (NMPC) and a 1-bit T/NT field. Subsequent branches are either correctly predicted (and committed) or are mispredicted. In the former case, the MPD decrements while in the latter case, the BMP copies new values into the MPD and NMPC-T/NT registers. By contrast, the NMPC register updates only after a branch misprediction. When the MPD decrements to zero, the BMP predicts that the next branch instruction will be mispredicted and corrects the predicted direction only if: 1) bits 3 to 6 of the program counter (PC) match the NMPC field and 2) the branch predictor's predicted direction is the same as the T/NT field of the NMPC-T/NT register.

If a branch misprediction occurs before the MPD register decrements to zero (36), i.e., the BMP overestimated the distance, the BMP's prediction of a branch misprediction is not used (38), which subsequently does not result in any extra branch mispredictions. It is important to note that output of the BMP is a prediction of the distance and address of the next-to-be mispredicted branch. This output is fundamentally different than the predicted direction that is the output of conventional branch predictors (i.e., direction). Finally, since the results indicate that incorrect MPBT distance prediction cause very, very few extra branch mispredictions, saturating confidence counters are not employed.

To track the number of correct branches between mispredictions, the BMP uses an 8-bit branch counter (BC). The BC increments each time a branch commits. Note that the difference between the MPD and BC register is that the MPD measures the distance between mispredicted branches, whereas the BC register holds the predicted distance until the next misprediction.

After a branch misprediction, the BMP updates 1) the 8-bit MPD field with the value of the BC register, 2) the 4-bit NMPC field with bits 3 to 6 of the misprediction branch's PC, and 3) the 1-bit T/NT field with the predicted direction (which was wrong) for the corresponding MPBT entry.

A BMP prediction is correct when the NMPC and T/NT fields match the PC and predicted direction, respectively, after the MPD register decrements to zero. Correct predictions set the used bit for that entry. However, it takes two incorrect predictions to evict an MPBT entry; the first incorrect prediction clears the used bit, but does not clear the MPD, NMPC, or T/NT fields, while second misprediction evicts the MPBT (clears all fields). This approach protects MPBT entries from eviction based on a single misprediction and from potential aliasing.

The only information that the BMP needs from the pipeline is the predicted direction, bits 3 to 6 of the PC, and when a branch instruction commits. The BMP only interacts with the branch predictor for a branch that is predicted to be mispredicted or an actual misprediction, which is significantly less often than other mechanisms do, e.g., a confidence estimator that interacts with the branch predictor on every predicted branch.

The BMP is both extremely energy and power efficient because 1) the BMP is essentially dormant for most of the application (other than MPBT updates after branch mispredictions, the only activity within the BMP is the decrementing of the MPD and the incrementing of the BC), 2) the BMP is relatively narrow (only 14-bits wide in this implementation, and 3) Small BMPs (e.g., 16 entries) can still significantly improve the branch prediction accuracy.

Figure 2:
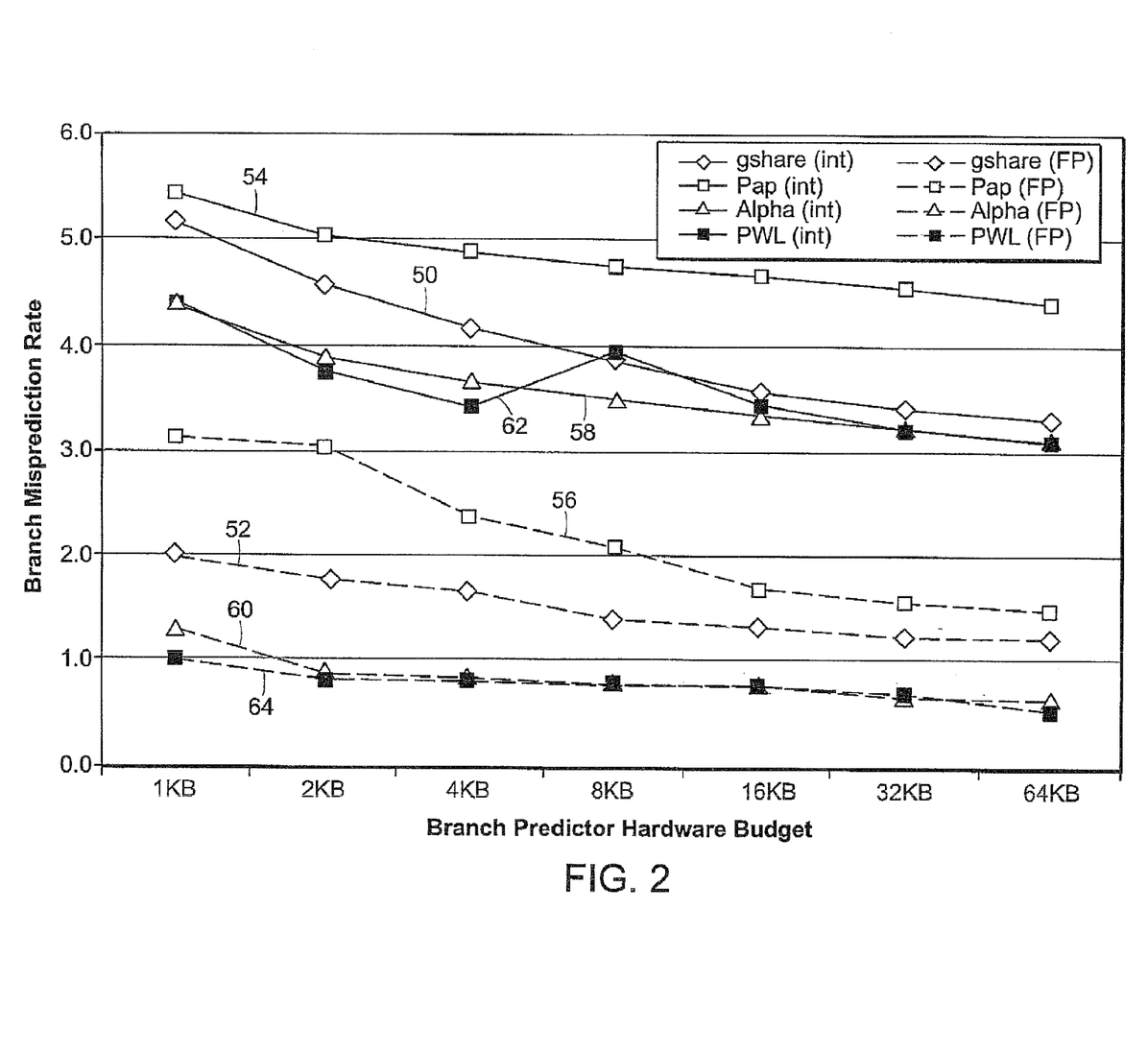
FIG. 2 shows a baseline branch prediction rate for a system in accordance with an embodiment of the invention.

FIG. 2 shows average branch misprediction rates for the integer and floating-point suites across all branch predictors and hardware budgets. The solid and dotted lines show the average misprediction rates for the integer and floating-point benchmarks, respectively. In particular, the baseline branch misprediction rate for gshare is shown at 50 and the floating point value is shown at 52, the baseline branch misprediction rate for Pap is shown at 54 and the floating point value is shown at 56, the base line branch misprediction rate for Alpha is shown at 58 and floating point is shown at 60, and the base line branch misprediction rate for PWL is shown at 62 and the floating point value is shown at 64.

The results shown in FIG. 2 show that the average branch misprediction rate is less than 10% for all branch predictors, hardware budgets, and suites. And, with the exception of the value twolf, the misprediction rate is under 10% for all benchmarks.

Figure 3A:
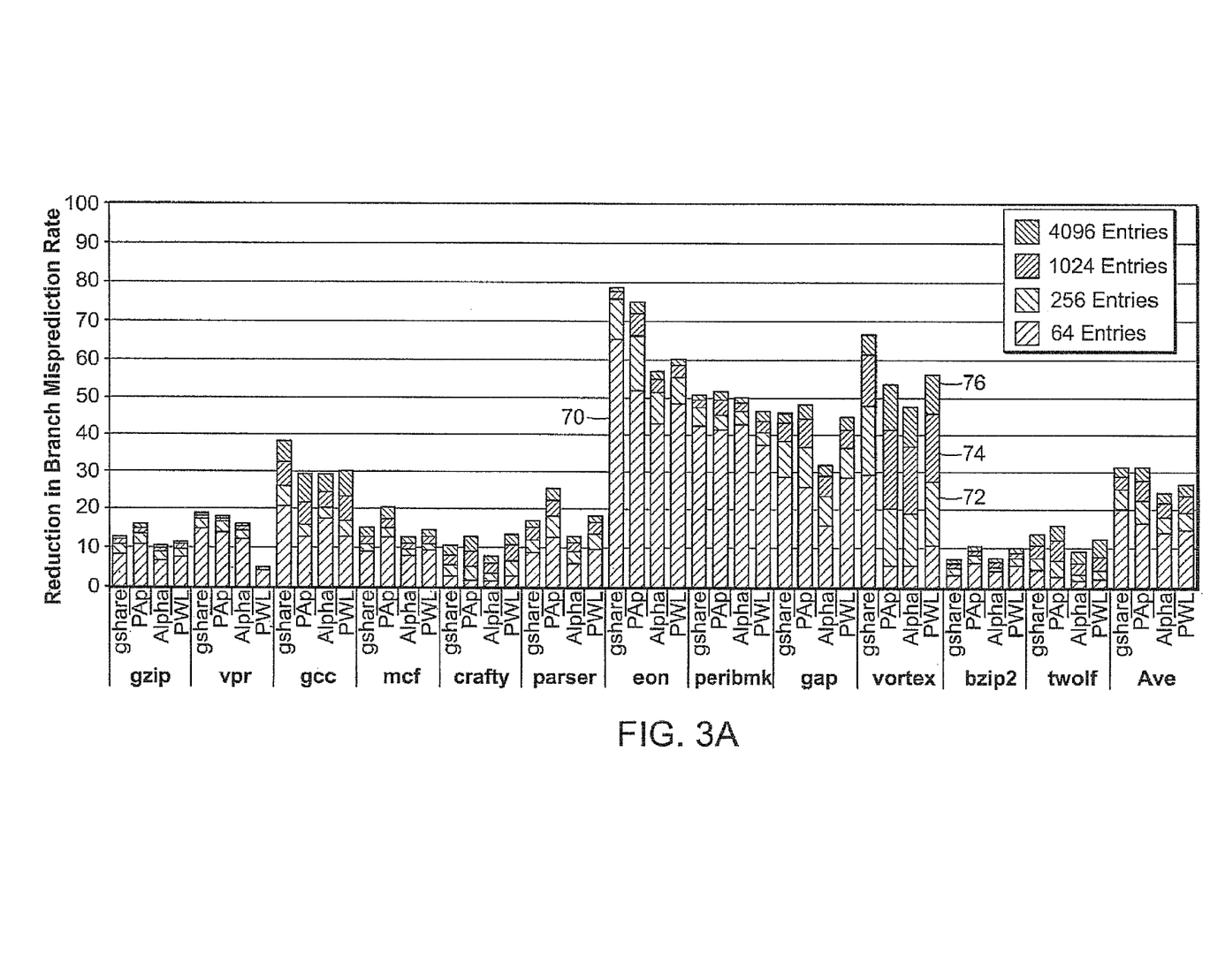
FIGS. 3A and 3B show integer benchmarks and floating point benchmarks respectively for reduction in branch misprediction rate due to adding a system in accordance with an embodiment of the invention to an 8 KB branch predictor.
Figure 3B:
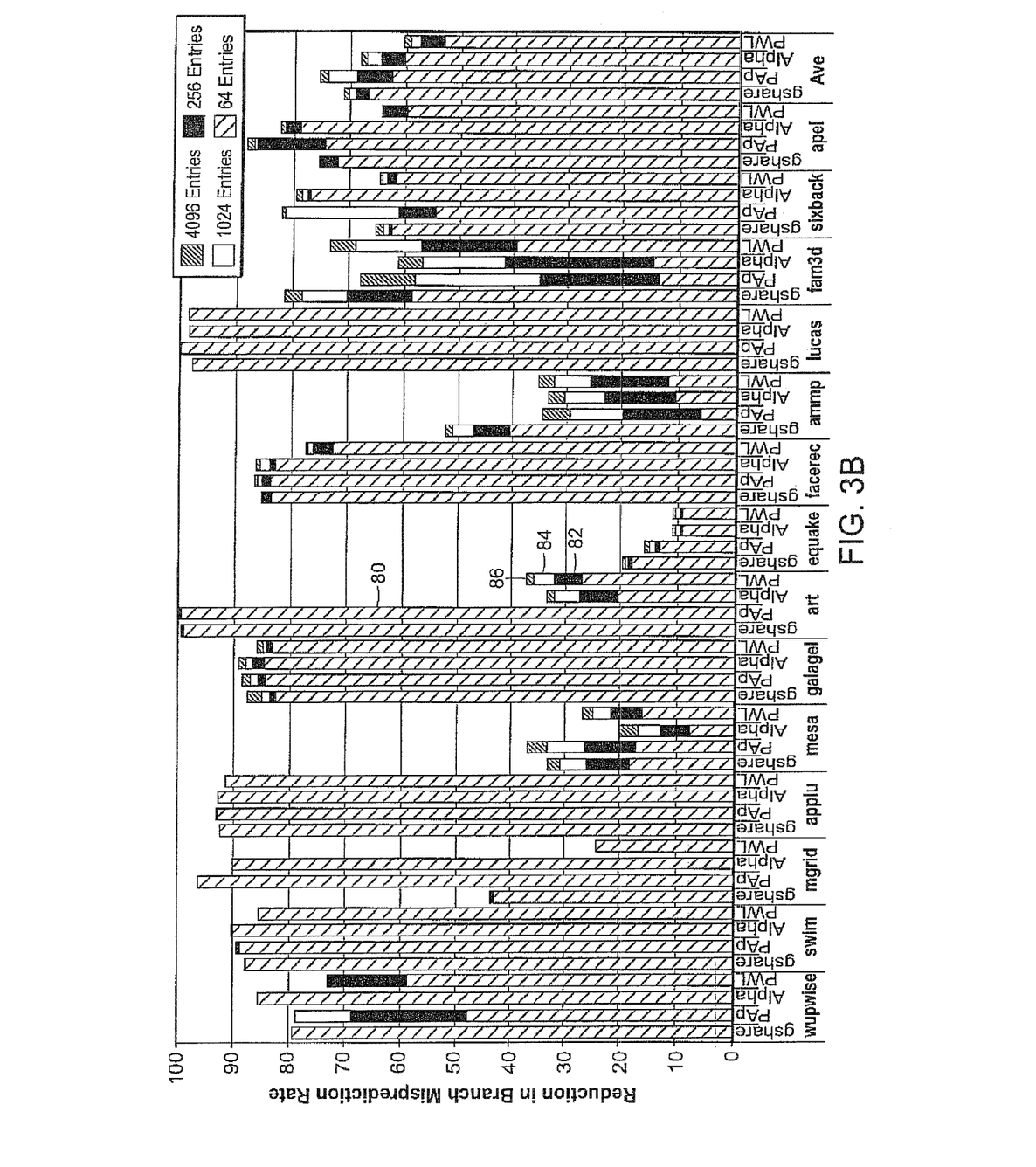

FIGS. 3A and 3B show the percentage reduction in the branch misprediction rates due to adding a BMP to the base branch predictor for the integer (FIG. 3A) and the floating point suites (FIG. 3B), respectively. The results in these Figures are for a branch predictor hardware budget of 8 KB, but are representative of the results for the other hardware budgets. Results are shown for 8 KB in the following discussion for the same reason. The right-most set of bars show the average reduction for each branch predictor for each suite of benchmarks.

For each bar, the bottom-most segment shows the percentage reduction in the misprediction rate due to adding a 64-entry BMP (e.g., 70 and 80). The three top-most segments (e.g., 72, 74, 76 and 82, 84, 86) show the additional reduction in the misprediction rate due to using 256-, 1024-, and 4096-entry BMPs respectively. For example, in eon, adding a 64-entry BMP reduces the misprediction rate by 65.4%; increasing the BMP to 256 entries further reduces the misprediction rate by 10.3%, for a total of 75.7%.

For the integer benchmarks (FIG. 3A), adding a 4096-entry BMP to the base predictor reduces the average branch misprediction rate by 24.2% (Alpha) to 31.3% (PAp). The reduction in the misprediction rate for the floatingpoint benchmarks ranges from 60.2% (piecewise-linear) to 75.4% (PAp). From the results in these two figures, it may be determined that adding a BMP may reduce the misprediction rate of all branch predictors, small or large, simple or complex, for all benchmarks. This conclusion is extremely significant because it shows that patterns of branch mispredictions exist for all branch predictors, and can be easily detected and corrected, thus validating the efficacy of complementary branch predictors.

Finally, the results in FIG. 3A show that increasing number of BMP entries further decreases the branch misprediction rate, albeit with diminishing returns. By contrast, the results in FIG. 3B show that, for most benchmarks, a 64-entry BMP is large enough to capture most of the reduction in the misprediction rate. Although larger BMPs yield diminishing returns, as is the case for larger branch predictors, they are not on the critical path of the processor and do not increase the misprediction penalty.

Figure 4:
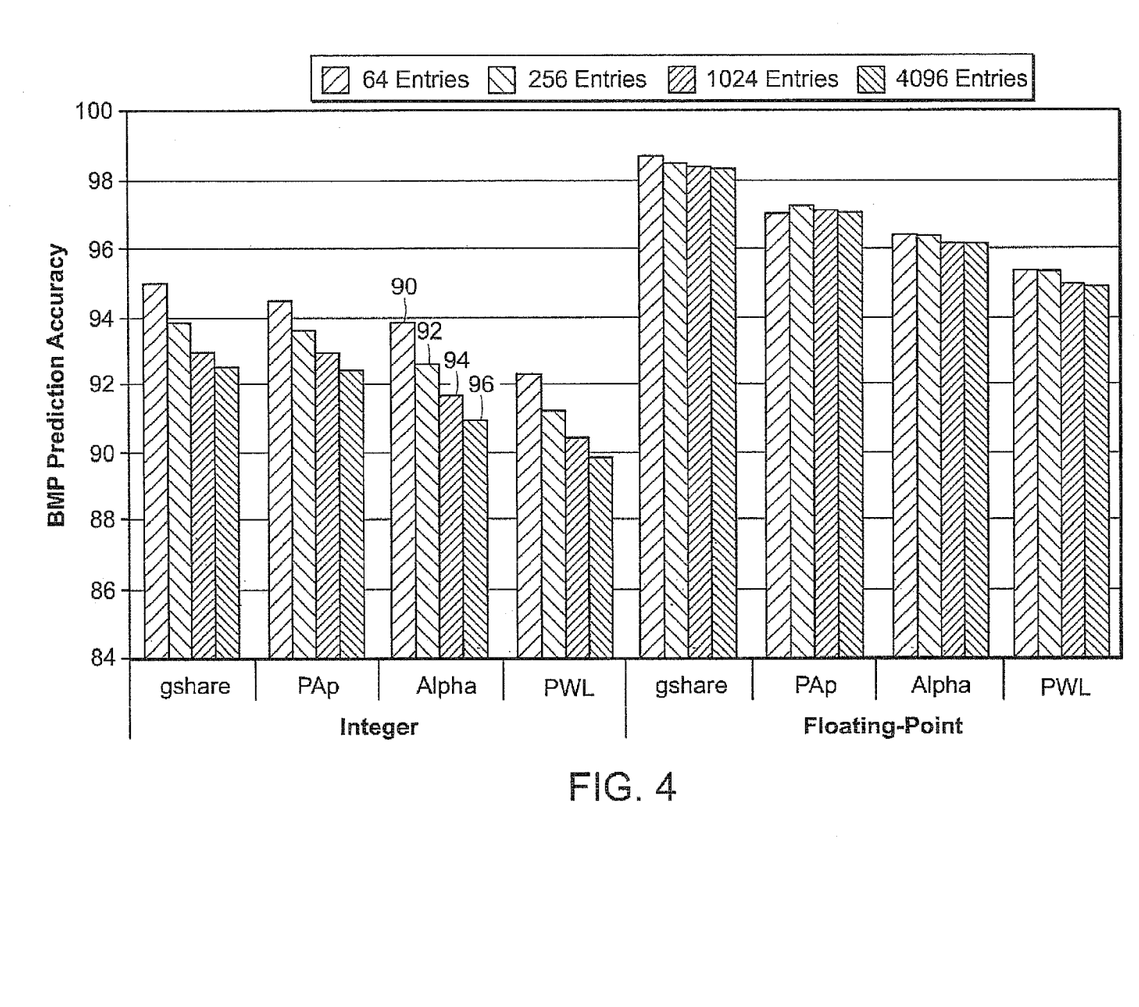
FIG. 4 shows prediction accuracy for a system in accordance with an embodiment of the invention for an 8 KB branch predictor.

FIG. 4 shows the prediction accuracy of the BMP. To compute the prediction accuracy, the number of branch predictions that were successfully corrected were divided by the sum of the numbers of successfully and unsuccessfully corrected branch predictions. Note that successful/unsuccessful branches do not include the branches that were correctly identified by the BMP, but where the estimated distance was too high (i.e., the BMP predicts that the branch will mispredict much further in the future).

FIG. 4 shows at 90, 92, 94 and 96 prediction accuracies for 64, 256, 1024, and 4096 entry BMPs respectively. FIG. 4 shows that for most BMP sizes and branch predictors, the BMP prediction accuracy is over 90%. This means that the BMP is extremely accurate in predicting both which future branch will mispredict next and when it will be mispredicted.

There are also several significant differences between the BMP and a loop predictor (LP). First, the BMP is not limited only to loops, but rather may target all types of branches. Second, the loop predictor uses local history to make predictions while the BMP uses different types of global history (e.g., global misprediction history) to make its predictions. Third, the LP makes a prediction for every branch, while the BMP only makes a prediction after a mispredicted branch. Therefore, the BMP is accessed less frequently, which is important for power reasons, and is not on the processor's critical path. Finally, since the LP competes with other constituent predictors within the branch predictor, even if it is chosen as the highest confidence prediction, its prediction may not be different than the predictions from the other constituent predictors, i.e., may predict correctly anyway. By contrast, the BMP only makes predictions for branches that are frequently mispredicted, i.e., unlikely to be predicted correctly. To quantify the performance difference between a LP and a BMP, a loop predictor that was implemented as described in "A 256 Kbits L-TAGE branch predictor," *Journal of Instruction-Level Parallelism* Second Championship Branch Prediction Competition, by A. Seznec (2006).

Figure 5:
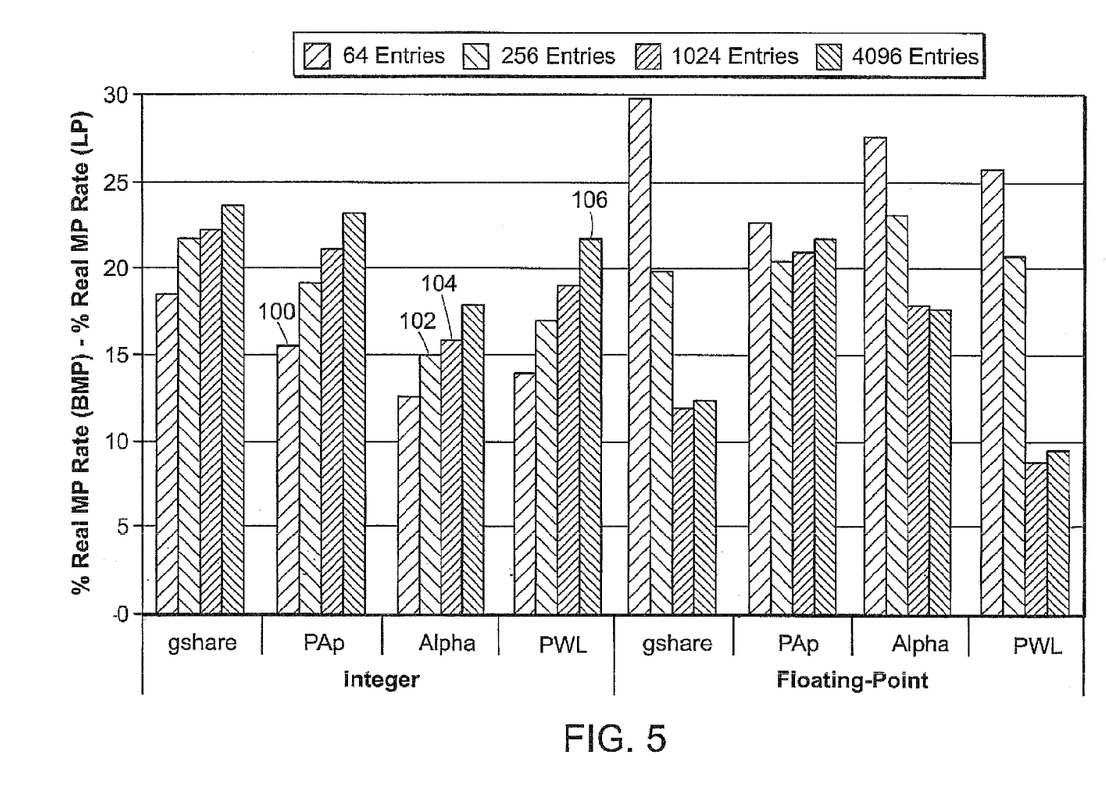
FIG. 5 shows differences in the percentage reduction of the branch misprediction rate.

FIG. 5 shows the difference in the percentage reduction of the branch misprediction rates for four different loop predictor sizes (shown at 100 for 64 entry BMP, shown at 102 for 256 entry BMP, shown at 104 for 1024 entry BMP, and shown at 106 for 4096 entry BMP. The number of BMP entries was set to match the number of entries of the loop predictor for all loop predictor sizes. The values on the y-axis were computed using the following formula:

Difference=% reduction in the branch misprediction rate due to the BMP−% reduction in the branch misprediction rate due to the loop predictor.

Positive result numbers mean that the BMP reduces the branch misprediction rate more than the loop predictor, while the opposite is true for negative result numbers. Note that the average result in FIGS. 3A and 3B show the percentage reduction in the misprediction rate due to the BMP. FIG. 5 shows, therefore, the difference in the percentage reduction of the branch misprediction rate, i.e., % misprediction reduction BMP−% misprediction reduction loop predictor for an 8 KB branch predictor.

Figure 6:
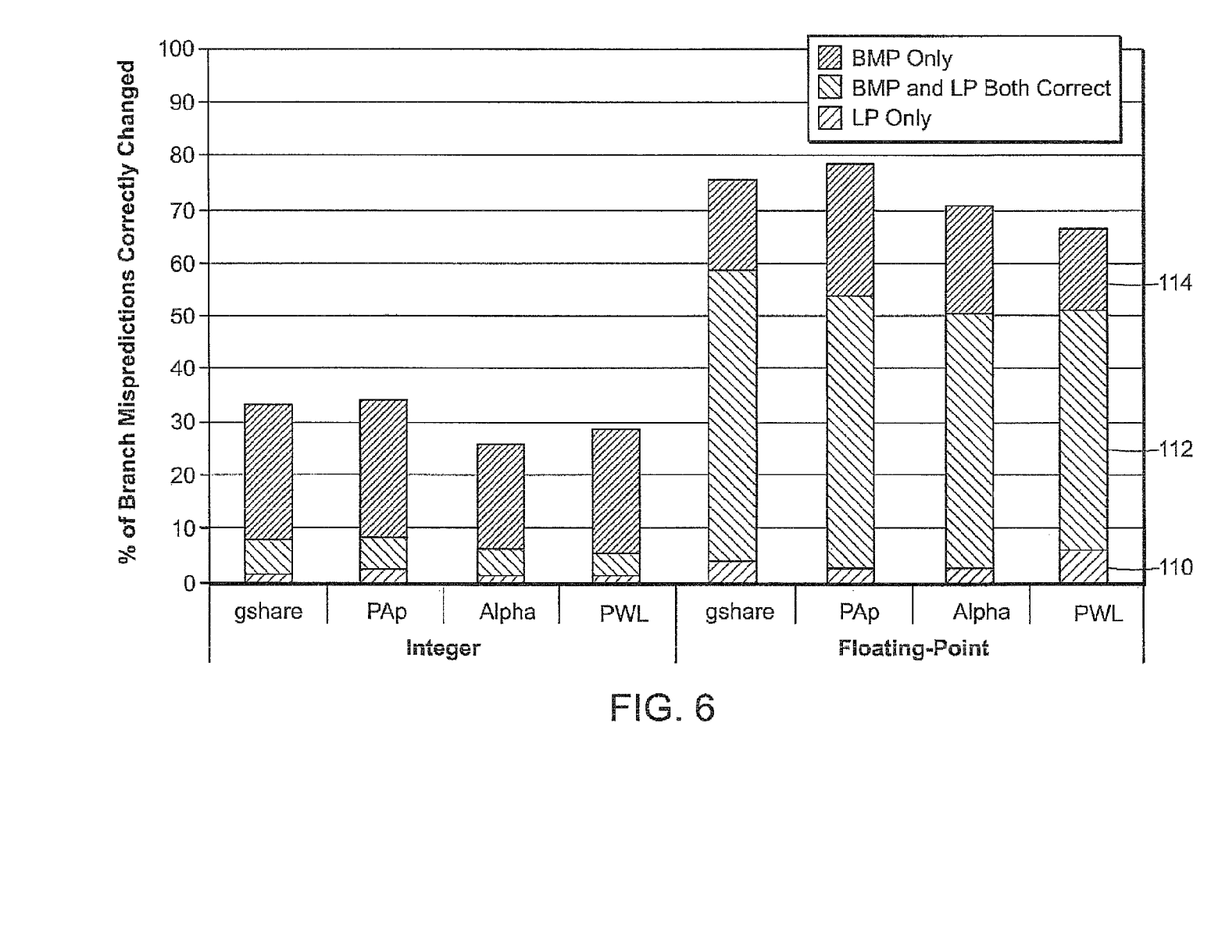
FIG. 6 shows the breakdown of branches that were successfully predicted due to using a loop predictor or a system in accordance with an embodiment of the invention as a percentage of the total number of mispredictions.

FIG. 6 shows breakdown of branches that were successfully predicted due to using a loop predictor or a BMP as a percentage of the total number of mispredictions. The sum shown at 110 relates to the use of the loop predictor only, the sum at 112 relates to the use of the loop predictor and the BMP, and the sum at 114 relates to the use of the BMP only. The sum of the bottom two segments therefore, is the percentage of mispredictions that were avoided due to using the LP, while the sum of the top two segments shows the percentage of mispredictions that were successfully corrected by the BMP. The loop predictor and BMP size was 4096 entries and the hardware budget of the branch predictor was 8 KB.

Since the y-axis values in FIG. 5 for all branch predictors are significantly greater than zero, the BMP reduces the branch misprediction rate more significantly than the loop predictor does.

FIG. 6 shows the breakdown of branches, as a percentage of all branch mispredictions (i.e., when the loop predictor and BMP are not used), that were successfully predicted by the loop predictor, but not by the BMP (bottom-most segment—"LP-Only" as shown at 110); the BMP, but not by the LP (topmost segment—"BMP Only" as shown at 114); and by both the BMP and LP (middle segment—"BMP and LP Both Correct" as shown at 112). Therefore, the height of the bottom two segments shows the percentage of mispredictions that were avoided due to using the LP, while the height of the top two segments shows the percentage of mispredictions that were successfully corrected by the BMP. The size of both the loop predictor and BMP was 4096 entries.

For the integer benchmarks, the results in FIG. 6 show that the loop predictor corrects a very small number of mispredictions (less than 2.3% for all branch predictors) that the BMP does not correctly predict. Overall, the bottom two segments show that the loop predictor corrects fewer than 8.1% of the mispredictions. By contrast, the BMP corrects at least 23% of all mispredictions, including 18% of all mispredictions that the loop predictor does not correctly predict.

The results for the floating-point benchmarks are similar, with the exception that the loop predictor corrects a much higher number of mispredictions. Nevertheless, the BMP outperforms the loop predictor for all predictors.

Although results have shown that the BMP may significantly reduce the branch misprediction rate, using different and/or larger branch predictors may yield the same result. However, as described in the introduction, the downside of using more complex and/or larger branch predictors is higher prediction latencies and misprediction penalties. An alternative design approach is to partition the branch predictor's bit budget between the conventional branch predictor and a complementary branch predictor like the BMP.

Table 1 shows the hardware budget that a branch predictor without a BMP needs to have to match or exceed the branch prediction accuracy of a 2 KB branch predictor with a 1024-entry BMP (<2 KB hardware budget). The total BP+BMP hardware budget is less than 4 KB.

TABLE 1

| Suite | gshare | PAp | Alpha | PWL |
|---|---|---|---|---|
| Int | 16 KB | >64 KB | 16 KB | 32 KB |
| FP | >64 KB | >64 KB | >64 KB | >64 KB |

The results in Table 1 show that for integer benchmarks, a branch predictor without a BMP needs to have a hardware budget that is at least four times as large as the branch predictor with the BMP mechanism. For the PAp branch predictor, the hardware budget needs to be at least 16 times larger. For the floating-point benchmarks, the hardware budget for the conventional branch predictor needs to be more than 64 KB for all four branch predictors. However, using such a larger branch predictor would most likely significantly increase the prediction latency, thus offsetting the performance gains due to the higher branch prediction accuracy. By contrast, adding the BMP mechanism to a smaller, faster branch predictor can achieve the same or higher prediction accuracies without incurring higher prediction latencies.

EXAMPLE

Figure 7:
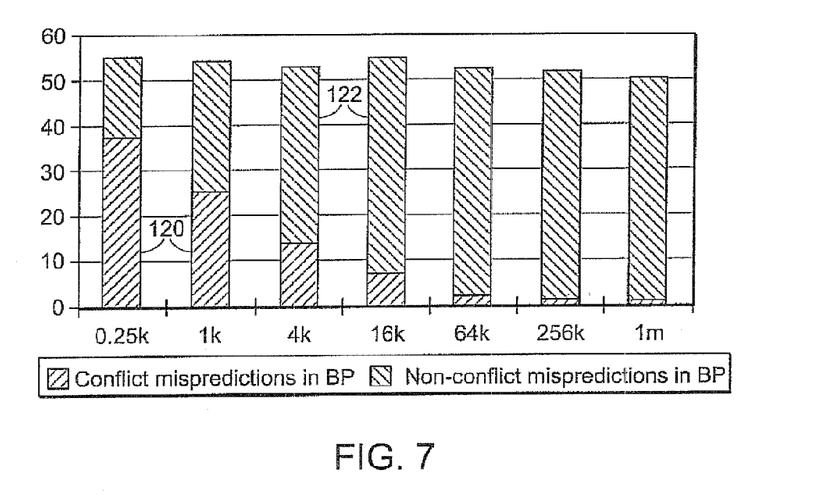
FIG. 7 shows percentage reduction in mispredictions with a 0.5 kB prediction system in accordance with an embodiment of the invention for varying sizes of gshare branch predictions for conflict mispredictions in branch predictions and non-conflict mispredictions in branch predictions.

To investigate why and where a BMP helps to correct branch mispredictions, it may first be determined whether the BMP corrects branch mispredictions that are the result of conflicts in branch predictor table, i.e., aliasing. Conflicts occur when multiple branch-history pairs share the same location in the branch predictor table. FIG. 7 shows at 120 the percentage of branch mispredictions corrected by BMP that are due to the conflicts in the branch prediction table and shows at 122 the percentage of branch mispredictions corrected that are due to non-conflicts in the branch prediction table, for varying sizes of gshare branch predictor. FIG. 7 shows the average behavior of 8 selected SPEC benchmarks (gcc, eon, perl, gap, vortex, mesa, fma3d, and apsi) where BMP does very well. To filter out the impact of fixed loop counts, benchmarks where both BMP and a loop predictor do well are not included.

FIG. 7 shows at 120 that, for a constant 0.5 KB size BMP, the percentage of mispredictions corrected by BMP that are due to conflicts in the branch predictor table decreases as the branch predictor size increases, from 60% when using 0.25 KB BP to less than 4% for 64 KB and larger BPs. Since the percentage of the mispredictions due to conflicts decreases dramatically for increasing branch predictor sizes (From 68% for 0.25 KB gshare to 1.8% for 1 MB gshare (not shown here)) and since the BMP can reduce the overall branch misprediction rate by about 50% for different sizes of the gshare predictor, as shown in FIG. 7, the BMP does not primarily correct branch mispredictions that are due to conflict in the branch predictor tables only, but does correct mispredictions due to other non-capacity-based reasons as well.

Figure 8:
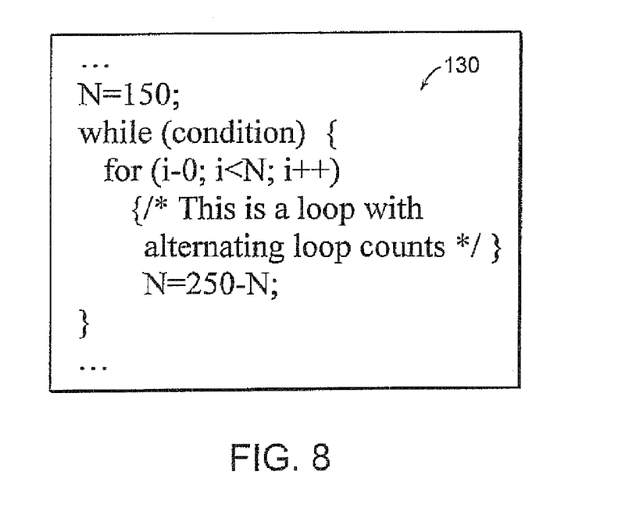
FIG. 8 shows a programming code example that functions well in a prediction system in accordance with an embodiment of the invention The drawings are shown for illustrative purposes only.

To understand the causes of branch mispredictions that are not due to conflicts, profile data and the source code for the 8 SPEC 2000 benchmarks were analyzed. It was observed that in these benchmarks, 30% to 60% of the mispredictions that are corrected by BMP are due to loop branches that have varying loop counts (which are longer than what a branch predictor can distinguish), or have early loop exits (such as a break in a for loop or a while loop). FIG. 8 shows at 130 a representative code segment that functions well in a prediction system in accordance with an embodiment of the invention. Variations of this example code occur in all benchmarks, often with unstable loop counts or early loop exits. This example shows a simple loop whose loop trip count alternates between 100 and 150. The exit branch for the for loop will be mispredicted as many times as the while loop condition is true. For the example, 150 bits of history is needed to eliminate the mispredictions at the loop bound. Simulations confirm that various branch predictors with a 256 KB hardware budget and an 8 KB loop predictor mispredicted the loop exit branch every time. By contrast, a 4-entry BMP can easily correct all of these mispredictions by predicting the next misprediction distance, which is either 101 or 151.

Another example where the BMP works is an early exit branch inside a for loop, which further complicates the branch history. This type of behavior is also often seen in the benchmarks that we studied. The early exit branch inside the for loop will be mispredicted often when it is taken. BMP can also correct this type of mispredictions, while other branch predictors that we tested can not.

In summary, the code in FIG. 8 shows that a BMP is an alternative approach to exploit long branch histories. While some advanced branch predictors have been proposed, such as neural predictors or O-GEHL predictor, they are much more complex and larger than a simple BMP. BMP complements branch predictors to exploit very long histories without significant hardware complexity and delay. The ability to provide longer history and to help alleviate branch predictor table conflicts is therefore a helpful way in which a BMP may correct mispredictions.

Those skilled in the art will appreciate that numerous modifications and variations may be made to the above disclosed embodiments without departing from the spirit and scope of the invention.

The invention claimed is:

1. A hardware system for providing branch misprediction prediction in a microprocessor, said system comprising:
    a mispredicted branch table that includes address, distance, and true/not true fields; and
    an index to the mispredicted branch table that is formed responsive to 1) a current mispredicted branch, 2) a global history, 3) a global misprediction history, and 4) a branch misprediction distance, wherein a plurality of incorrect predictions are required to evict a mispredicted branch table entry to protect the mispredicted branch table entry from being evicted based on a single misprediction or aliasing event only.

2. The system as claimed in claim 1, wherein said system further includes a misprediction distance register that is in communication with the mispredicted branch table.

3. The system as claimed in claim 1, wherein said system further includes a concatenated register of global history bits and global misprediction history bits.

4. The system as claimed in claim 1, wherein said system further includes a branch counter that is employed to track a number of correctly predicted branches between mispredictions.

5. The system as claimed in claim 1, wherein said system operates outside of a functional path of a branch predictor.

6. The system as claimed in claim 1, wherein said system predicts which future branch will be mispredicted next and predicts a misprediction time when the future branch is mispredicted will occur.

7. The system as claimed in claim 6, wherein said system further changes a prediction of the future branch that will be mispredicted next at the misprediction time.

8. The system as claimed in claim 1, wherein said system counts a distance, in committed branches, between consecutive branch mispredictions.

9. The system as claimed in claim 8, wherein said distance, in committed branches, between consecutive branch mispredictions, represents a time prediction of when a next branch misprediction will occur.

10. The system as claimed in claim 1, wherein said mispredicted branch table further includes a used data field that is indicative of whether an associated prediction was incorrect.

11. The method as claimed in claim 1, wherein said plurality of incorrect predictions comprises a first incorrect prediction that clears a used bit but does not clear a distance estimator register, a mispredicted program counter, or the true/not true fields, and a second incorrect prediction that evicts the mispredicted branch table entry.

12. A system for providing branch misprediction prediction in a microprocessor, said system comprising:
    a mispredicted branch table that includes address and distance data regarding mispredictions;
    a distance estimator register and a history register that are coupled to the mispredicted branch table for providing the address and distance data to the table regarding a future branch that is expected to be mispredicted and misprediction time that the future branch is expected to be mispredicted; and
    an index to the mispredicted branch table that is employed to predict branch mispredictions, wherein a plurality of incorrect predictions are required to evict a mispredicted branch table entry to protect the mispredicted branch table entry from being evicted based on a single misprediction or aliasing event only.

13. The system as claimed in claim 12, wherein said history register includes a concatenated register of global history bits and global misprediction history bits.

14. The system as claimed in claim 12, wherein said mispredicted branch table further includes true/not true fields.

15. The system as claimed in claim 12, wherein said system counts a distance, in committed branches, between consecutive branch mispredictions.

16. The system as claimed in claim 12, wherein said system interacts with a branch predictor only for branches that are predicted to be mispredicted or have actually been mispredicted.

17. The system as claimed in claim 12, wherein said system operates outside of a function path of a branch predictor.

18. The system as claimed in claim 12, wherein said plurality of incorrect predictions comprises a first incorrect prediction that clears a used bit but does not clear the distance estimator register, a mispredicted program counter, or true/not true fields, and a second incorrect prediction that evicts the mispredicted branch table entry.

19. A method of predicting branch mispredictions in a microprocessor, said method comprising the steps of:
    providing misprediction address and distance data to a mispredicted branch table from a history register and a distance estimator; and
    accessing the mispredicted branch table outside of a function path of a branch predictor to predict branch misprediction, wherein a plurality of incorrect predictions are required to evict a mispredicted branch table entry to protect the mispredicted branch table entry from being evicted based on a single misprediction or aliasing event only.

20. The method as claimed in claim 19, wherein said method further includes the step of counting a distance, in committed branches, between consecutive branch mispredictions.

21. The method as claimed in claim 19, wherein said misprediction branch table further includes true/not true data.

22. The method as claimed in claim 19, wherein said step of providing misprediction address and distance data to the mispredicted branch table further includes performing at least one exclusive OR operation.

23. The method as claimed in claim 19, wherein said plurality of incorrect predictions comprises a first incorrect prediction that clears a used bit but does not clear a distance estimator register, a mispredicted program counter, or true/not true fields, and a second incorrect prediction that evicts the mispredicted branch table entry.

* * * * *